(12) United States Patent
Wakao et al.

(10) Patent No.: US 8,656,773 B2
(45) Date of Patent: Feb. 25, 2014

(54) RATIONALITY DIAGNOSTIC DEVICE FOR ALCOHOL CONCENTRATION SENSOR

(75) Inventors: Kazuhiro Wakao, Susono (JP); Mie Sasai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/516,888

(22) PCT Filed: Dec. 28, 2010

(86) PCT No.: PCT/JP2010/073762
§ 371 (c)(1),
(2), (4) Date: Jun. 18, 2012

(87) PCT Pub. No.: WO2012/090317
PCT Pub. Date: Jul. 5, 2012

(65) Prior Publication Data
US 2013/0340496 A1    Dec. 26, 2013

(51) Int. Cl.
*G01F 23/26* (2006.01)
*F02D 41/22* (2006.01)

(52) U.S. Cl.
USPC .... 73/304 C; 73/290 B; 73/290 R; 73/304 R; 702/182; 702/183

(58) Field of Classification Search
USPC ......... 73/290 R, 290 B, 290 V, 304 R, 340 C; 702/182, 183, 185
See application file for complete search history.

(56) References Cited

U.S. PATENT DOCUMENTS

| | | | |
|---|---|---|---|
| 4,470,300 A | * | 9/1984 | Kobayashi ............... 73/304 C |
| 5,497,753 A | * | 3/1996 | Kopera ..................... 123/494 |
| 7,941,264 B2 | * | 5/2011 | Tashima et al. ............ 701/109 |
| 2004/0079150 A1 | * | 4/2004 | Breed et al. .................. 73/291 |
| 2004/0237951 A1 | | 12/2004 | Abe |
| 2006/0063053 A1 | | 3/2006 | Higashionji et al. |

(Continued)

FOREIGN PATENT DOCUMENTS

| | | | | |
|---|---|---|---|---|
| JP | 03059423 A | * | 3/1991 | ............... G01F 9/00 |
| JP | A-3-285119 | | 12/1991 | |

(Continued)

OTHER PUBLICATIONS

Jim Weir, "Gauging Fuel Quantity, Cheap", Kitplanes, Sep. 1989, pp. 58-60.*

(Continued)

*Primary Examiner* — David A Rogers
(74) *Attorney, Agent, or Firm* — Oliff PLC

(57) ABSTRACT

A rationality diagnostic device for an alcohol concentration sensor includes a capacitance-type remaining fuel amount sensor as a remaining fuel amount sensor disposed in a fuel tank. The capacitance-type remaining fuel amount sensor has such output characteristics that its output value is determined by the amount of fuel remaining in the fuel tank and the alcohol concentration of the fuel. The rationality diagnostic device corrects the output value of the remaining fuel amount sensor in accordance with the output value of the alcohol concentration sensor to eliminate an alcohol-concentration-dependent component from the output value of the remaining fuel amount sensor. The rationality diagnostic device then verifies the accuracy of the corrected output value of the remaining fuel amount sensor to judge whether the rationality of the alcohol concentration sensor is maintained.

8 Claims, 5 Drawing Sheets

(56) References Cited

U.S. PATENT DOCUMENTS

| | | | |
|---|---|---|---|
| 2009/0090179 A1* | 4/2009 | Carmona et al. | 73/304 R |
| 2010/0036587 A1 | 2/2010 | Kato et al. | |
| 2010/0138136 A1* | 6/2010 | Nagasaki et al. | 701/103 |
| 2010/0206059 A1* | 8/2010 | Suzuki et al. | 73/114.38 |
| 2010/0264937 A1* | 10/2010 | Tarui et al. | 324/601 |

FOREIGN PATENT DOCUMENTS

| JP | 04279741 A * | 10/1992 | F02D 41/04 |
|---|---|---|---|
| JP | A-5-10943 | 1/1993 | |
| JP | A-6-27063 | 2/1994 | |
| JP | A-10-184479 | 7/1998 | |
| JP | A-2004-308540 | 11/2004 | |
| JP | A-2005-127724 | 5/2005 | |
| JP | A-2006-114487 | 4/2006 | |
| JP | A-2009-197771 | 9/2009 | |
| JP | A-2010-71081 | 4/2010 | |
| JP | B2-4477644 | 6/2010 | |
| JP | 2011099349 A * | 5/2011 | |

OTHER PUBLICATIONS

Bill Siuru, "Sensors in Flexible-Fuel Vehicles", Sensors, Sep. 1992, pp. 47-53.*
International Search Report issued in International Patent Application No. PCT/JP2010/073762 dated Jan. 25, 2011 (with translation).

* cited by examiner

RATIONALITY DIAGNOSTIC DEVICE FOR ALCOHOL CONCENTRATION SENSOR

TECHNICAL FIELD

The present invention relates to a rationality diagnostic device that diagnoses the rationality of an alcohol concentration sensor that measures the alcohol concentration of fuel used in an internal combustion engine.

BACKGROUND ART

It is known that an FFV (flexible fuel vehicle) can use alcohol or alcohol-blended gasoline as fuel. An internal combustion engine for the FFV includes an alcohol concentration sensor that determines the alcohol concentration of an employed fuel. An output value of the alcohol concentration sensor is used as a parameter for air-fuel ratio control of the internal combustion engine. This not only acquires desired torque but also ensures satisfactory emissions performance without regard to the ethanol concentration of the employed fuel.

As described above, the alcohol concentration sensor for the FFV internal combustion engine plays an important role to ensure the performance of the internal combustion engine. However, as is the case with the other sensors, there is no assurance that the alcohol concentration sensor properly functions at all times. Wire breakage, short-circuiting, sensor element deterioration, or other abnormality may occur in the alcohol concentration sensor. If, in the event of such abnormality, the output value of the alcohol concentration sensor is used to control the internal combustion engine, then an operation appropriate for the alcohol concentration of the employed fuel cannot be performed. This causes the deterioration of internal combustion engine performance such as emissions performance and fuel efficiency.

As such being the case, it is demanded that the rationality of the alcohol concentration sensor for the FFV internal combustion engine be diagnosed to verify the reliability of the output value of the alcohol concentration sensor. However, it is difficult to directly verify the accuracy of the output value of the alcohol concentration sensor. The reason is that it is not easy to accurately measure the alcohol concentration by using means other than the alcohol concentration sensor. It is quite difficult to prepare a necessary standard at the time of verification.

Under such circumstances, a technology disclosed in Japanese Patent No. 4477644 determines the difference between a target air-fuel ratio and an actual air-fuel ratio obtained when a fuel injection amount is adjusted in accordance with the target air-fuel ratio, and diagnoses, in accordance with the determined difference, whether or not the alcohol concentration sensor is abnormal. When the output value of the alcohol concentration sensor is highly reliable, the actual air-fuel ratio should be in agreement with or close to the target air-fuel ratio. Therefore, if the actual air-fuel ratio significantly differs from the target air-fuel ratio, it is probable that the reliability of the output value of the alcohol concentration sensor is low.

However, air-fuel ratio changes are brought about by various multiple factors in addition to fuel injection amount changes. Hence, even when the actual air-fuel ratio is closed to the target air-fuel ratio, it cannot always be said that the rationality of the alcohol concentration sensor is maintained. The technology described in Japanese Patent No. 4477644 cannot detect an abnormality in the alcohol concentration sensor until the abnormality decreases the reliability of the output value of the alcohol concentration sensor and causes the actual air-fuel ratio to differ from the target air-fuel ratio. In other words, an alcohol concentration sensor abnormality cannot be detected until the discrepancy between the actual air-fuel ratio and target air-fuel ratio actually degrades the emissions performance.

An alternative method for diagnosing the rationality of the alcohol concentration sensor would be to prepare two alcohol concentration sensors that generate the same output when no abnormality exists, and compare the output values of the alcohol concentration sensors. If the alcohol concentration sensors generate different output values or the difference between their output values is greater than a threshold value when the alcohol concentration of the employed fuel is changed, this method makes it possible to conclude that the alcohol concentration sensors are no longer rational.

In reality, however, the alcohol concentration of the fuel employed for the FFV internal combustion engine changes only when it is fueled. Therefore, even if an alcohol concentration sensor abnormality occurs in such a manner as to decrease the reliability of the sensor output value, such an abnormality cannot be detected until a refueling is performed later. Further, if the fuel added at the time of refueling has the same alcohol concentration as the fuel remaining in a fuel tank, the output values of the alcohol concentration sensors remain unchanged. Therefore, the alcohol concentration sensor abnormality still cannot be detected.

As explained above, the conventionally proposed technology for diagnosing the rationality of the alcohol concentration sensor is not adequately capable of diagnosing the rationality of the alcohol concentration sensor properly and easily.

PRIOR ART LITERATURE

Patent Documents

Patent Document 1: Japanese Patent No. 4477644
Patent Document 2: JP-A-2010-071081
Patent Document 3: JP-A-1994-027063
Patent Document 4: JP-A-1993-010943
Patent Document 5: JP-A-1998-184479
Patent Document 6: JP-A-2006-114487
Patent Document 7: JP-A-2005-127724

SUMMARY OF THE INVENTION

An object of the present invention is to properly and easily diagnose the rationality of an alcohol concentration sensor that measures the alcohol concentration of fuel used in an internal combustion engine. To achieve the above object, the present invention provides a below-described rationality diagnostic device for an alcohol concentration sensor.

The rationality diagnostic device for an alcohol concentration sensor, which is provided by the present invention, includes a capacitance-type remaining fuel amount sensor as the remaining fuel amount sensor to be disposed in a fuel tank. The output characteristics of the capacitance-type remaining fuel amount sensor are such that its output value is determined in accordance with the amount of fuel remaining in the fuel tank and the alcohol concentration of the fuel. To eliminate an alcohol-concentration-dependent component from the output value of the remaining fuel amount sensor, the rationality diagnostic device corrects the output value of the remaining fuel amount sensor in accordance with the output value of the alcohol concentration sensor. If the rationality of the alcohol concentration sensor is maintained, the corrected output value of the remaining fuel amount sensor should properly represent the amount of fuel remaining in the fuel tank. The rationality diagnostic device verifies the accuracy of the corrected output value of the remaining fuel amount sensor to judge whether the rationality of the alcohol concentration sensor is maintained.

Verifying the accuracy of the corrected output value of the remaining fuel amount sensor is extremely easier than verifying the accuracy of the output value of the alcohol concentration sensor. The reason is that it is not difficult to prepare a standard for verification as the corrected output value of the remaining fuel amount sensor is associated with a remaining fuel amount that can be measured by various well-known means. Therefore, the rationality diagnostic device can easily diagnose the rationality of the alcohol concentration sensor. In addition, the rationality diagnostic device can make a diagnosis when the output value of the remaining fuel amount sensor and the output value of the alcohol concentration sensor are available. Consequently, the rationality diagnostic device can quickly diagnose the rationality of the alcohol concentration sensor.

If the remaining fuel amount sensor is abnormal, the accuracy of the output value of the remaining fuel amount sensor decreases even when the alcohol concentration sensor is normal. Therefore, the rationality of the alcohol concentration sensor could be judged to be lost no matter whether the alcohol concentration sensor is normal. However, an abnormality in the alcohol concentration sensor should be found without fail in order to ensure the emissions performance of the internal combustion engine. Hence, the aforementioned judgment does not constitute any problem. The reason is that a certain abnormality exists in a system and needs to be corrected by performing, for instance, an inspection procedure and a parts replacement procedure. The rationality diagnostic device makes it possible to surely prevent an erroneous judgment from being formulated to conclude that the rationality is maintained in a situation where the rationality of the alcohol concentration sensor is lost due to its abnormality or fault.

Specifically, the following methods may be employed to verify the accuracy of the corrected output value of the remaining fuel amount sensor.

A first method calculates the remaining fuel amount from the corrected output value of the remaining fuel amount sensor when the fuel tank is in a particular known state concerning the remaining fuel amount. The first method then compares the calculated remaining fuel amount against a known remaining fuel amount in the particular state, and verifies the accuracy of the output value of the remaining fuel amount sensor in accordance with the result of comparison. If the calculated remaining fuel amount agrees with the known remaining fuel amount or the difference between them is not greater than a threshold value, the first method makes it possible to conclude that the accuracy of the corrected output value of the remaining fuel amount sensor is acceptable. In such an instance, a diagnosis is made that the rationality of the alcohol concentration sensor is maintained.

A second method not only calculates the remaining fuel amount from the corrected output value of a first remaining fuel amount sensor, but also measures the remaining fuel amount with a second remaining fuel amount sensor whose output value is not dependent on alcohol concentration. The second method then compares the calculated remaining fuel amount against the value measured by the second remaining fuel amount sensor, and verifies the accuracy of the corrected output value of the first remaining fuel sensor in accordance with the result of comparison. If the calculated remaining fuel amount agrees with the value measured by the second remaining fuel amount sensor or the difference between them is not greater than a threshold value, the second method makes it possible to conclude that the accuracy of the corrected output value of the first remaining fuel amount sensor is acceptable.

A third method not only calculates the change in the remaining fuel amount during a predetermined period in accordance with the corrected output value of the remaining fuel amount sensor, but also calculates the amount of fuel consumption during the predetermined period in accordance with the amount of fuel injected from an injector. The third method then compares the calculated change in the remaining fuel amount against the calculated amount of fuel consumption, and verifies the accuracy of the corrected output value of the remaining fuel amount sensor in accordance with the result of comparison. If the calculated change in the remaining fuel amount agrees with the calculated amount of fuel consumption or the difference between them is not greater than a threshold value, the third method makes it possible to conclude that the accuracy of the corrected output value of the remaining fuel amount sensor is acceptable.

BEST MODE FOR CARRYING OUT THE INVENTION

First Embodiment

A first embodiment of the present invention will now be described with reference to the accompanying drawings.

Figure 1:
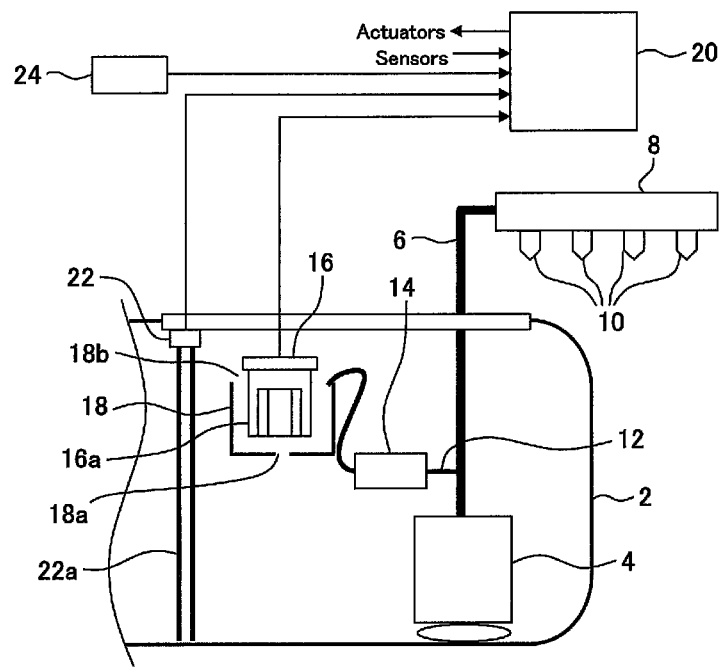
FIG. 1 is a schematic diagram illustrating the configuration of a fuel supply system for an internal combustion engine to which an ethanol concentration sensor rationality diagnostic device according to a first embodiment of the present invention is applied.

A rationality diagnostic device according to the first embodiment is applied to an alcohol concentration sensor (hereinafter referred to as the ethanol concentration sensor) for an FFV internal combustion engine that can use ethanol, gasoline, or ethanol-blended gasoline as fuel. FIG. 1 is a schematic diagram illustrating the configuration of a fuel supply system for an internal combustion engine that includes the ethanol concentration sensor rationality diagnostic device according to the present embodiment.

The fuel supply system shown in FIG. 1 includes the ethanol concentration sensor 16, which is disposed in a fuel tank 2. It should be noted, however, that the ethanol concentration sensor 16 is not directly immersed in the fuel stored in the fuel tank 2, but is placed in a fuel container 18 provided in the fuel tank 2. The top of the fuel container 18 is open. The bottom of the fuel container 18 is provided with a fuel outlet 18a that discharges the fuel trapped inside the fuel container 18. The ethanol concentration sensor 16 according to the present embodiment is a capacitance-type sensor whose electrode section 16a is completely housed in the fuel container 18.

The fuel container 18 is connected to the leading end of a return flow path 12. The return flow path 12 branches off from a main flow path 6 that connects a fuel pump 4, which draws and pressurizes the fuel in the fuel tank 2, to a delivery pipe 8, which distributes the fuel to an injector 10 of each cylinder. A pressure regulator 14 is installed in the middle of the return flow path 12. The pressure regulator 14 is a valve that adjusts the pressure applied to the fuel in the main flow path 6. When the pressure regulator 14 opens, part of the pressurized fuel returns to the fuel tank 2 through the return flow path 12. In this instance, the fuel discharged from the return flow path 12 is introduced into the fuel container 18. The electrode section 16a of the ethanol concentration sensor 16 is then immersed in the fuel so that the ethanol concentration sensor 16 can measure the concentration of ethanol. To permit the fuel to be stored in the fuel container 18, the hole diameter of the fuel outlet 18a is designed so that the flow rate of the fuel discharged from the fuel outlet 18a does not exceed the flow rate of the fuel introduced from the return flow path 12.

Figure 2:
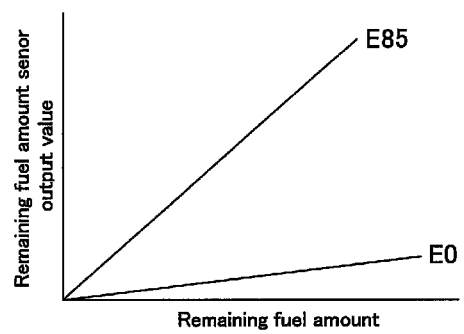
FIG. 2 is a graph illustrating the output characteristics of a capacitance-type remaining fuel amount sensor.

A remaining fuel amount sensor 22 is disposed in the fuel tank 2. The remaining fuel amount sensor 22 is a capacitance-type sensor whose electrode section 22a is extended from the ceiling of the fuel tank 2 to its bottom. The remaining fuel amount sensor 22, which is a capacitance-type sensor, has such output characteristics that its output value is determined by the amount of fuel remaining in the fuel tank 2 and the ethanol concentration of the fuel as shown in FIG. 2. FIG. 2 is a graph illustrating the relationship between a remaining fuel amount and a sensor output value. More specifically, line E0 indicates the relationship between the remaining fuel amount and sensor output value when the ethanol concentration of fuel is 0%, whereas line E85 indicates the relationship between the remaining fuel amount and sensor output value when the ethanol concentration of fuel is 85%. In this document, the term "remaining fuel amount" represents not the mass of fuel but the volume of fuel.

The output values of the ethanol concentration sensor 16 and the remaining fuel amount sensor 22 are both loaded into an ECU 20, which is a control device for the internal combustion engine. The ECU 20 determines the ethanol concentration of an employed fuel from the output value of the ethanol concentration sensor 16. The determined ethanol concentration is used as a parameter that determines a fuel injection amount for air-fuel ratio control. The determined ethanol concentration is also used during a process that determines the remaining fuel amount from the output value of the remaining fuel amount sensor 22. As mentioned earlier, the output value of the remaining fuel amount sensor 22 is affected by both the remaining fuel amount and the ethanol concentration. Therefore, when measuring the remaining fuel amount by using the output value of the remaining fuel amount sensor 22, it is necessary to eliminate an ethanol-concentration-dependent component from the sensor output value. The ECU 20 corrects the output value of the remaining fuel amount sensor 22 in accordance with the output value of the ethanol concentration sensor 16, and calculates the remaining fuel amount from the corrected output value of the remaining fuel amount sensor 22.

Further, the output values of various sensors other than the ethanol concentration sensor 16 and the remaining fuel amount sensor 22 are also loaded into the ECU 20. The present embodiment includes a liquid level detection switch 24 that is one of the various sensors, placed at a predetermined height in the fuel tank 2, and used to detect the liquid level of fuel stored in the fuel tank 2. The liquid level detection switch 24 outputs an ON signal when the liquid level of the fuel in the fuel tank 2 is higher than the switch 24, and outputs an OFF signal when the liquid level is lower than the switch 24. The output values of these various sensors inform the ECU 20 of the operating status and operating conditions of the internal combustion engine. In accordance with such information, the ECU 20 controls various actuators concerning the operation of the internal combustion engine.

The rationality diagnostic device according to the present embodiment is implemented when the ECU 20 functions as an arithmetic processing unit for the rationality diagnostic device in the above-described fuel supply system configuration. When the ECU 20 functions as the above-mentioned arithmetic processing unit, the ECU 20 executes a rationality judgment routine shown in the flowchart of FIG. 3. The routine is executed at fixed intervals during the operation of the internal combustion engine.

Figure 3:
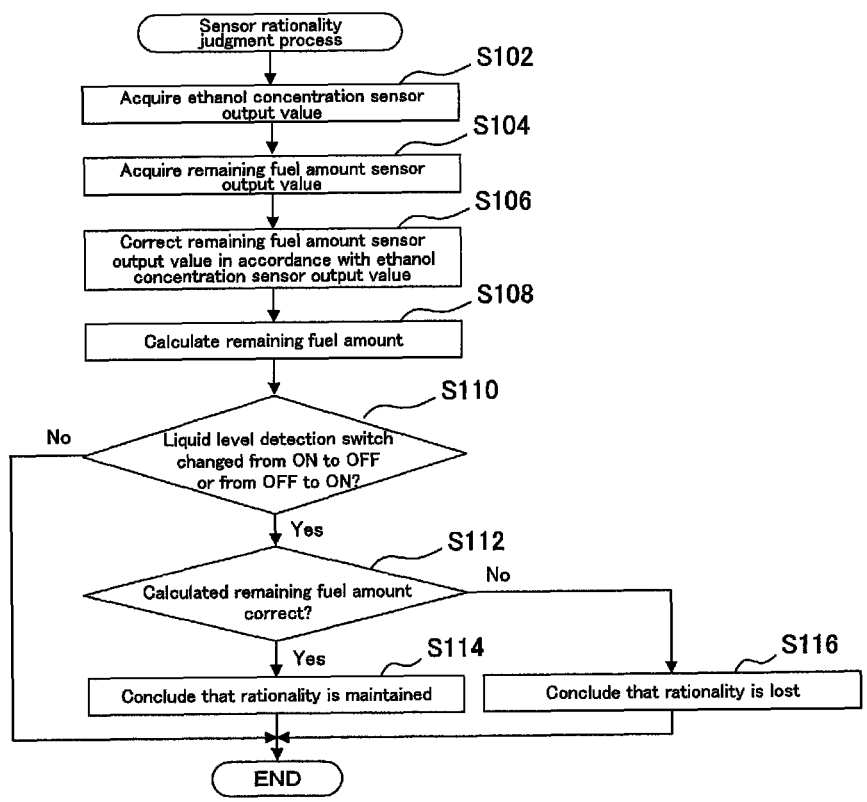
FIG. 3 is a flowchart illustrating an ethanol concentration sensor rationality judgment routine that is executed in the first embodiment of the present invention.

According to the routine shown in FIG. 3, the output value of the ethanol concentration sensor 16 is acquired in step S102, which is the first step. In step S104, the output value of the remaining fuel amount sensor 22 is acquired. In step S106, the output value of the remaining fuel amount sensor 22 is corrected in accordance with the output value of the ethanol concentration sensor 16. For example, a correction coefficient is determined in accordance with the output value of the ethanol concentration sensor 16, and the output value of the remaining fuel amount sensor 22 is multiplied by the correction coefficient. In step S108, the amount of fuel remaining in the fuel tank 2 is calculated from the corrected output value of the remaining fuel amount sensor 22.

In step S110, it is judged whether the signal of the liquid level detection switch 24 has changed from ON to OFF or from OFF to ON. The signal changes from ON to OFF when the liquid level drops due to fuel consumption. The signal changes from OFF to ON when the liquid level rises due to fueling. When the signal of the liquid level detection switch 24 changes, the liquid level coincides with the height at which the liquid level detection switch 24 is installed. The remaining fuel amount at the height of the liquid level detection switch 24 is known and stored in the ECU 20 as the known information for verification.

The routine does not formulate a rationality judgment until the signal of the liquid level detection switch 24 changes. When the signal of the liquid level detection switch 24 changes, the routine proceeds to step S112 and it is judged whether the ethanol concentration sensor 16 is rational. In the present embodiment, a rationality judgment is formulated by verifying the accuracy of the remaining fuel amount calculated in step S108. In step S112, therefore, the remaining fuel amount calculated in step S108 is compared against the remaining fuel amount that is stored in the ECU 20 for verification purposes.

If the comparison result obtained in step S112 indicates that the difference between the calculated remaining fuel amount and the remaining fuel amount for verification is not greater than a predetermined threshold value, the routine concludes that the calculated remaining fuel amount is correct. If the calculated remaining fuel amount is correct, it can be concluded that the output value of the ethanol concentration sensor 16, which is used for the calculation, is reliable. In this instance, the routine proceeds to step S114 and it is concluded that the rationality of the ethanol concentration sensor 16 is maintained.

If, on the other hand, the difference between the calculated remaining fuel amount and the remaining fuel amount for verification is greater than the predetermined threshold value, the calculated remaining fuel amount is not correct. If the calculated remaining fuel amount is incorrect, it is due to an abnormality in either the ethanol concentration sensor 16 or the remaining fuel amount sensor 22. However, it does not matter which of these sensors 16, 22 is abnormal. To ensure the emissions performance of the internal combustion engine, it is essential that an abnormality in the ethanol concentration sensor 16 be detected without fail. In this case, therefore, no problem occurs even if the ethanol concentration sensor 16 is suspected of abnormality. In either case, there is a certain abnormality in the system. Therefore, even if the ethanol concentration sensor 16 is normal, it is necessary to perform an inspection procedure and a parts replacement procedure. Hence, if the comparison result obtained in step S112 indicates that the calculated remaining fuel amount is incorrect, the routine proceeds to step S116 and it is concluded that the rationality of the ethanol concentration sensor 16 is lost.

When the routine formulates a rationality judgment as described above, it is possible to surely prevent an erroneous judgment from being formulated to conclude that the rationality is maintained in a situation where the rationality of the ethanol concentration sensor 16 is lost due to its abnormality or fault. If a diagnosis is made that the rationality of the ethanol concentration sensor 16 is lost, the ECU 20 uses a malfunction indicator lamp (MIL) or other indicator to notify a driver of the occurrence of abnormality.

Second Embodiment

A second embodiment of the present invention will now be described with reference to the accompanying drawings.

As is the case with the rationality diagnostic device according to the first embodiment, the rationality diagnostic device according to the second embodiment is applied to an ethanol concentration sensor for an internal combustion engine having the fuel supply system shown in FIG. 1. However, the element identified by the reference numeral 24 in FIG. 1 is a float-type remaining fuel amount sensor in the second embodiment although it is a liquid level detection switch in the first embodiment.

Figure 4:
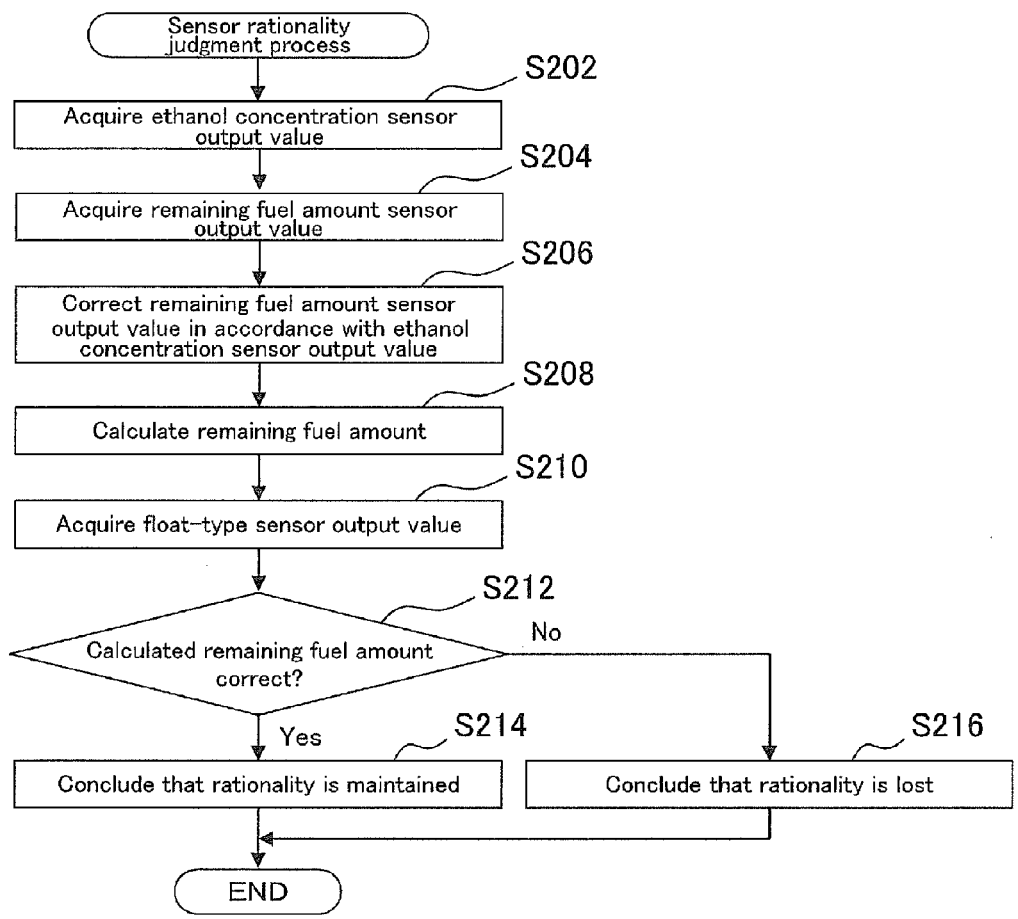
FIG. 4 is a flowchart illustrating an ethanol concentration sensor rationality judgment routine that is executed in a second embodiment of the present invention.

The second embodiment differs from the first embodiment in the method of judging whether the ethanol concentration sensor 16 is rational. The routine shown in the flowchart of FIG. 4 is executed by the ECU 20 in the second embodiment to judge whether the ethanol concentration sensor 16 is rational. Steps performed by the routine will be described below.

According to the routine shown in FIG. 4, the output value of the ethanol concentration sensor 16 is acquired in step S202, which is the first step. In step S204, the output value of the remaining fuel amount sensor 22 is acquired. In step S206, the output value of the remaining fuel amount sensor 22 is corrected in accordance with the output value of the ethanol concentration sensor 16. In step S208, the amount of fuel remaining in the fuel tank 2 is calculated from the corrected output value of the remaining fuel amount sensor 22. The steps performed so far are the same as those in the first embodiment.

Next, the routine proceeds to step S210, in which the output value of the float-type remaining fuel amount sensor is loaded into the ECU 20. The output value of the float-type remaining fuel amount sensor remains unaffected by ethanol concentration unlike the output value of a capacitance-type sensor. The ECU 20 calculates the amount of fuel remaining in the fuel tank 2 from the output value of the float-type remaining fuel amount sensor. The remaining fuel amount measured in step S210 is used as the information for verifying the accuracy of the remaining fuel amount calculated in step S208.

In step S212, a judgment is formulated by comparing the remaining fuel amount calculated in step S208 against the remaining fuel amount measured by the float-type remaining fuel amount sensor. Unlike the judgment formulated in step S112 of the routine shown in FIG. 3, the judgment in step S212 can be formulated each time the routine is executed. In other words, the rationality judgment method employed in the second embodiment provides more judgment opportunities than the rationality judgment method employed in the first embodiment.

If the comparison result obtained in step S212 indicates that the difference between the calculated remaining fuel amount and the remaining fuel amount measured by the float-type remaining fuel amount sensor is not greater than a predetermined threshold value, it is concluded that the calculated remaining fuel amount is correct. If the calculated remaining fuel amount is correct, it can be concluded that the output value of the ethanol concentration sensor 16 is reliable. In this instance, the routine proceeds to step S214 and it is concluded that the rationality of the ethanol concentration sensor 16 is maintained.

If, on the other hand, the difference between the calculated remaining fuel amount and the remaining fuel amount measured by the float-type remaining fuel amount sensor is greater than the predetermined threshold value, the calculated remaining fuel amount is not correct. If the calculated remaining fuel amount is incorrect, it is conceivable that the output value of the ethanol concentration sensor 16 may be unreliable. Hence, the routine proceeds to step S216 and it is concluded that the rationality of the ethanol concentration sensor 16 is lost.

Third Embodiment

A third embodiment of the present invention will now be described with reference to the accompanying drawings.

As is the case with the rationality diagnostic device according to the first embodiment, the rationality diagnostic device according to the third embodiment is applied to an ethanol concentration sensor for an internal combustion engine having the fuel supply system shown in FIG. 1. In the third embodiment, the sensor identified by the reference numeral 24 in FIG. 1 may be of any type.

Figure 5:
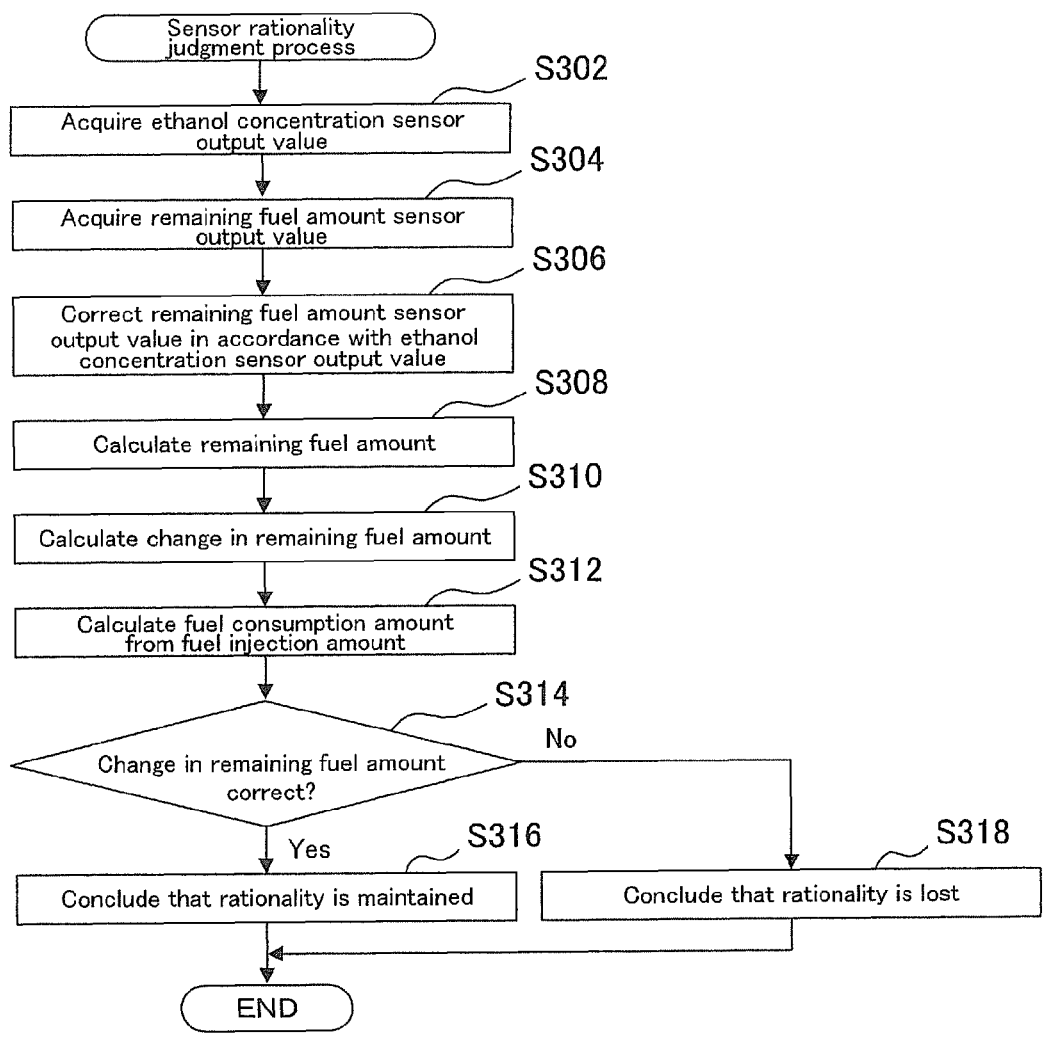
FIG. 5 is a flowchart illustrating an ethanol concentration sensor rationality judgment routine that is executed in a third embodiment of the present invention.

The third embodiment is characterized by its method of judging whether the ethanol concentration sensor 16 is rational. The routine shown in the flowchart of FIG. 5 is executed by the ECU 20 in the third embodiment to judge whether the ethanol concentration sensor 16 is rational. Steps performed by the routine will be described below.

According to the routine shown in FIG. 5, the output value of the ethanol concentration sensor 16 is acquired in step S302, which is the first step. In step S304, the output value of the remaining fuel amount sensor 22 is acquired. In step S306, the output value of the remaining fuel amount sensor 22 is corrected in accordance with the output value of the ethanol concentration sensor 16. In step S308, the amount of fuel remaining in the fuel tank 2 is calculated from the corrected output value of the remaining fuel amount sensor 22. The steps performed so far are the same as those in the first and second embodiments.

Next, the routine proceeds to step S310 and the change in the amount of remaining fuel during a predetermined period is calculated. The length of the predetermined period is not specifically limited. However, it is preferred that the predetermined period be long enough to encounter a definite change in the calculated remaining fuel amount.

Next, in step S312, the amount of fuel consumed in the fuel tank 2 during the predetermined period is calculated from the amount of fuel injected from the injector 10 during the predetermined period. As the amount of fuel injected from the injector 10 is determined by the pressure applied to the fuel and the time during which the injector 10 is driven, ethanol concentration does not influence the amount of fuel consumption calculated in step S312. Hence, the fuel consumption amount calculated in step S312 can be used as the information for verifying the accuracy of the change in the remaining fuel amount, which is calculated in step S310.

In step S314, it is judged whether the ethanol concentration sensor 16 is rational. More specifically, the change in the remaining fuel amount, which is calculated in step S310, is compared against the fuel consumption amount calculated in step S312. The judgment in step S314 can be formulated each time the predetermined period elapses.

If the comparison result obtained in step S314 indicates that the difference between the calculated change in the remaining fuel amount and the calculated fuel consumption amount is not greater than a predetermined threshold value, the routine concludes that the calculated change in the remaining fuel amount is correct. If the calculated change in the remaining fuel amount is correct, it can be concluded that the output value of the ethanol concentration sensor 16, which is used for the calculation, is reliable. In this instance, the routine proceeds to step S316 and it is concluded that the rationality of the ethanol concentration sensor 16 is maintained.

If, on the other hand, the difference between the calculated change in the remaining fuel amount and the calculated fuel consumption amount is greater than the predetermined threshold value, the calculated change in the remaining fuel amount is not correct. In such an instance, it is conceivable that the output value of the ethanol concentration sensor 16 may be unreliable. Hence, the routine proceeds to step S316 and it is concluded that the rationality of the ethanol concentration sensor 16 is lost.

Other

Figure 6:
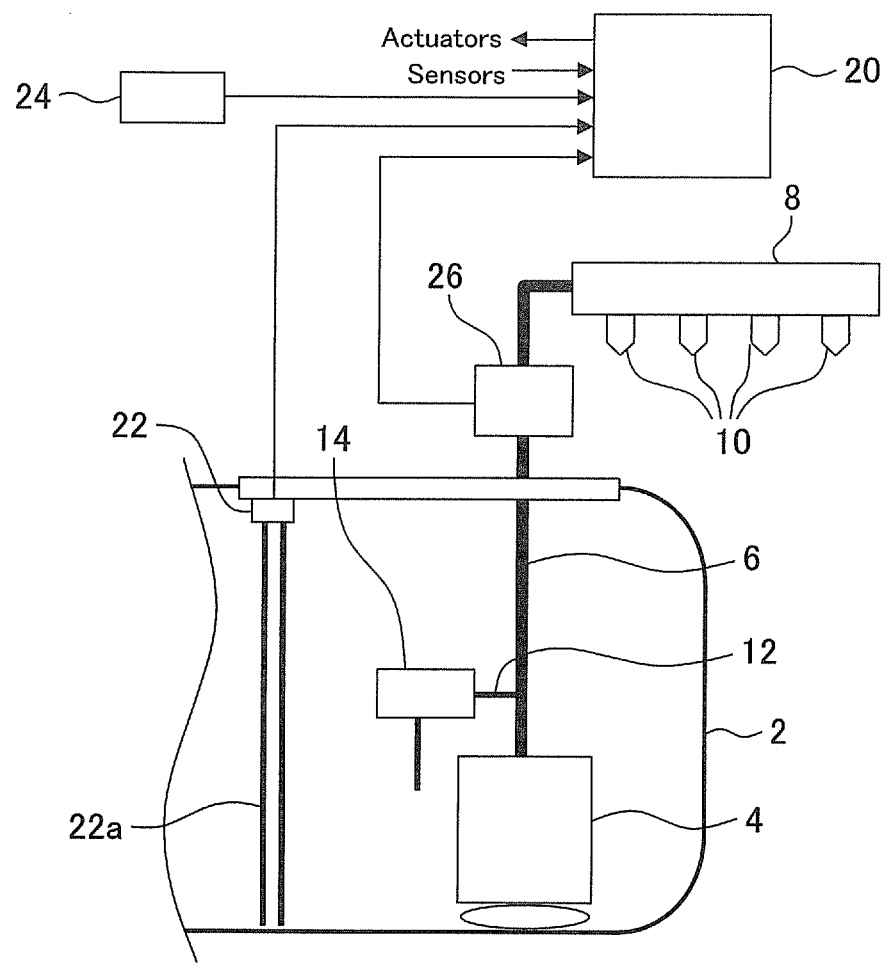
FIG. 6 is a schematic diagram illustrating a modified example of a position at which an ethanol concentration sensor is disposed in the fuel supply system.

While the present invention has been described in connection with the foregoing embodiments, it should be understood that the present invention is not limited to the foregoing embodiments. The present invention extends to various modifications that nevertheless fall within the scope and spirit of the present invention. For example, an ethanol concentration sensor 26 may be installed in the middle of the main flow path as indicated in FIG. 6. Further, although the ethanol concentration sensor 26 is disposed outside the fuel tank 2 shown in FIG. 6, the ethanol concentration sensor 26 may be disposed inside the fuel tank 2.

When the present invention is to be implemented, the alcohol concentration sensor to be subjected to a rationality diagnosis is not limited to a capacitance-type alcohol concentration sensor. As far as the alcohol concentration sensor generates an output value indicative of alcohol concentration, the alcohol concentration sensor to be subjected to a rationality diagnosis may use any sensing method. For example, a sensor that measures the alcohol concentration in accordance, for instance, with a refractive index, transmittance, specific gravity, or density may be employed.

| Description of Reference Numerals | |
| --- | --- |
| 2 | Fuel tank |
| 4 | Fuel pump |
| 6 | Main flow path |
| 8 | Delivery pipe |
| 10 | Injector |
| 12 | Return flow path |
| 14 | Pressure regulator |
| 16 | Ethanol concentration sensor |
| 18 | Fuel container |
| 20 | ECU |
| 22 | Remaining fuel amount sensor |

The invention claimed is:

1. A rationality diagnostic device for diagnosing the rationality of an alcohol concentration sensor that measures the alcohol concentration of fuel used in an internal combustion engine, the rationality diagnostic device comprising:

a capacitance-type remaining fuel amount sensor whose output value is determined in accordance with the amount of fuel remaining in a fuel tank and the alcohol concentration of the fuel;

sensor output correction means for correcting the output value of the remaining fuel amount sensor in accordance with the output value of the alcohol concentration sensor; and rationality judgment means for verifying the accuracy of the corrected output value of the remaining fuel amount sensor to judge whether the rationality of the alcohol concentration sensor is maintained.

2. The rationality diagnostic device according to claim 1, wherein, when the fuel tank is in a particular known state concerning the amount of remaining fuel, the rationality judgment means verifies the accuracy of the corrected output value of the remaining fuel amount sensor by comparing the remaining fuel amount calculated in accordance with the corrected output value of the remaining fuel amount sensor against the known remaining fuel amount in the particular state.

3. The rationality diagnostic device according to claim 1, wherein the rationality judgment means verifies the accuracy of the corrected output value of the remaining fuel amount sensor by comparing the remaining fuel amount calculated in accordance with the corrected output value of the remaining fuel amount sensor against a remaining fuel amount measured by another remaining fuel amount sensor whose output value is not dependent on alcohol concentration.

4. The rationality diagnostic device according to claim 1, wherein the rationality judgment means verifies the accuracy of the corrected output value of the remaining fuel amount sensor by comparing the change in the remaining fuel amount during a predetermined period, which is calculated in accordance with the corrected output value of the remaining fuel amount sensor, against the amount of fuel consumption during the predetermined period, which is calculated from the amount of fuel injected from an injector.

5. A rationality diagnostic device for diagnosing the rationality of an alcohol concentration sensor that measures the alcohol concentration of fuel used in an internal combustion engine, the rationality diagnostic device comprising:

a capacitance-type remaining fuel amount sensor whose output value is determined in accordance with the amount of fuel remaining in a fuel tank and the alcohol concentration of the fuel; and a computer that is programmed to:
correct the output value of the remaining fuel amount sensor in accordance with the output value of the alcohol concentration sensor; and
verify the accuracy of the corrected output value of the remaining fuel amount sensor to judge whether the rationality of the alcohol concentration sensor is maintained.

6. The rationality diagnostic device according to claim 5, wherein the computer is programmed to detect the fuel tank being in a particular known state concerning the amount of remaining fuel and verify the accuracy of the corrected output value of the remaining fuel amount sensor by comparing the remaining fuel amount calculated in accordance with the corrected output value of the remaining fuel amount sensor against the known remaining fuel amount in a particular state.

7. The rationality diagnostic device according to claim 5, wherein the computer is programmed to verify the accuracy of the corrected output value of the remaining fuel amount sensor by comparing the remaining fuel amount calculated in accordance with the corrected output value of the remaining fuel amount sensor against a remaining fuel amount measured by another remaining fuel amount sensor whose output value is not dependent on alcohol concentration.

8. The rationality diagnostic device according to claim 5, wherein the computer is programmed to verify the accuracy of the corrected output value of the remaining fuel amount sensor by comparing the change in the remaining fuel amount during a predetermined period, which is calculated in accordance with the corrected output value of the remaining fuel amount sensor, against the amount of fuel consumption during the predetermined period, which is calculated from the amount of fuel injected from an injector.

* * * * *